US011729047B2

(12) United States Patent
Yu et al.

(10) Patent No.: US 11,729,047 B2
(45) Date of Patent: *Aug. 15, 2023

(54) METHOD AND APPARATUS FOR ACKNOWLEDGING SCELL BEAM FAILURE RECOVERY REQUEST

(71) Applicant: FG Innovation Company Limited, Tuen Mun (HK)

(72) Inventors: Chia-Hao Yu, Taipei (TW); Chia-Hung Wei, Taipei (TW); Yu-Hsin Cheng, Taipei (TW); Tsung-Hua Tsai, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,378

(22) Filed: Jun. 10, 2022

(65) Prior Publication Data

US 2022/0303171 A1    Sep. 22, 2022

Related U.S. Application Data

(63) Continuation of application No. 16/791,789, filed on Feb. 14, 2020, now Pat. No. 11,394,602.

(Continued)

(51) Int. Cl.
*H04W 74/08* (2009.01)
*H04L 41/0654* (2022.01)
(Continued)

(52) U.S. Cl.
CPC ........ *H04L 41/0654* (2013.01); *H04L 1/1812* (2013.01); *H04W 72/23* (2023.01)

(58) Field of Classification Search
None
See application file for complete search history.

(56) References Cited

U.S. PATENT DOCUMENTS

| 10,313,970 B2 * | 6/2019 | Cai ...................... H04W 76/28 |
| 2012/0058998 A1 * | 3/2012 | Sanders .................. A61P 25/00 514/252.12 |

(Continued)

FOREIGN PATENT DOCUMENTS

| CN | 109076365 A | 12/2018 |
| WO | 2018/141303 A1 | 8/2018 |

(Continued)

OTHER PUBLICATIONS

Nokia et al: "SCell Beam Failure Recovery", 3GPP Draft; R2-1805342 SCell Beam Failure Recovery, 3rd Generation Partnership Project (3GPP), Mobile Competence Centre 650, Route Des Lucioles ; F-06921 Sophia-Antipolis Cedex ; France vol. RAN WG2, No. Sanya, China; Apr. 16, 2018-Apr. 20, 2018 Apr. 14, 2018 (Apr. 14, 2018).

(Continued)

*Primary Examiner* — Sithu Ko
(74) *Attorney, Agent, or Firm* — ScienBiziP, P.C.

(57) ABSTRACT

A method for SCell BFR performed by a BS is provided. The method includes: receiving, from a UE, a BFR MAC CE that includes a cell index of an SCell for which a beam failure is detected, and a reference signal index for the SCell, the BFR MAC CE is transmitted, by the UE, via a UL transmission associated with a HARQ process having a HARQ process ID; and transmitting, to the UE, DCI that schedules a PUSCH transmission with the HARQ process ID of the HARQ process that is used for the UL transmission of the BFR MAC CE, the DCI indicating a toggled NDI value, wherein the UE is configured to: determine, upon receiving the DCI, that the SCell BFR procedure is successfully completed; and monitor, on the SCell, a PDCCH using antenna port quasi-colocation parameters associated with the reference signal index after receiving the DCI.

18 Claims, 4 Drawing Sheets

Related U.S. Application Data (60) Provisional application No. 62/806,083, filed on Feb. 15, 2019.

(51) Int. Cl.
 *H04L 1/1812* (2023.01)
 *H04W 72/23* (2023.01)

(56) References Cited

U.S. PATENT DOCUMENTS

| | | |
|---|---|---|
| 2016/0302176 A1 | 10/2016 | Ahn et al. |
| 2018/0199314 A1 | 7/2018 | Takeda et al. |
| 2019/0053288 A1 | 2/2019 | Zhou et al. |
| 2019/0207667 A1 | 7/2019 | Zhou et al. |
| 2019/0253941 A1 | 8/2019 | Cirik et al. |
| 2019/0254110 A1 | 8/2019 | He et al. |
| 2019/0313264 A1 | 10/2019 | Lin |
| 2020/0029383 A1 | 1/2020 | Venugopal et al. |
| 2020/0052769 A1 | 2/2020 | Cirik et al. |
| 2020/0059285 A1 | 2/2020 | Zhang et al. |
| 2020/0374960 A1 | 11/2020 | Deenoo et al. |
| 2020/0404559 A1 | 12/2020 | Koskela et al. |
| 2021/0058130 A1* | 2/2021 | Zhu .................. H04B 7/0695 |
| 2021/0068162 A1* | 3/2021 | Agiwal ............. H04L 41/0668 |
| 2021/0126690 A1* | 4/2021 | Matsumura ........ H04B 7/0695 |
| 2021/0289372 A1 | 9/2021 | Liu et al. |

FOREIGN PATENT DOCUMENTS

| | | |
|---|---|---|
| WO | 2018/202081 A1 | 11/2018 |
| WO | 2019/028736 A1 | 2/2019 |
| WO | 2019/032882 A1 | 2/2019 |
| WO | 2019027294 A1 | 2/2019 |

OTHER PUBLICATIONS

Non-Final Rejection dated Jul. 2, 2021 for U.S. Appl. No. 16/791,789 which is the parent application of the instant application.
Final Rejection dated Nov. 26, 2021 for U.S. Appl. No. 16/791,789 which is the parent application of the instant application.
Notice of Allowance dated Mar. 25, 2022 for U.S. Appl. No. 16/791,789 which is the parent application of the instant application.

* cited by examiner

FIG. 6

METHOD AND APPARATUS FOR ACKNOWLEDGING SCELL BEAM FAILURE RECOVERY REQUEST

CROSS-REFERENCE TO RELATED APPLICATION(S)

This application is a continuation application of U.S. patent application Ser. No. 16/791,789, filed on Feb. 14, 2020, which claims the benefit of and priority to U.S. Provisional Patent Application Ser. No. 62/806,083, filed on Feb. 15, 2019. The contents of all of the above-mentioned applications are hereby fully incorporated herein by reference.

FIELD

The present disclosure generally relates to wireless communication and, more particularly, to a method for beam failure recovery (BFR) in cellular wireless communication networks.

BACKGROUND

Various efforts have been made to improve different aspects of wireless communications, such as data rate, latency, reliability, and mobility, for cellular wireless communication systems (e.g., fifth-generation (5G) New Radio (NR)). For example, beam management introduced in an NR system establishes and retains a suitable beam pair link, specifically a transmitter-side beam direction and a corresponding receiver-side beam direction that jointly provide good connectivity. In some cases, movements in the environment may lead to an established beam pair link being rapidly blocked. In NR, a BFR procedure is introduced to handle such beam failure events. In addition, carrier aggregation (CA) is supported in NR. A Primary Cell (PCell) may operate in sub-6 GHz frequency bands (Frequency Range 1, FR1) and a Secondary Cell (SCell) may operate in frequency bands above 24 GHz (Frequency Range 2, FR2). Beam failure (e.g., beam blockage) happens more frequently in FR2 because of the channel characteristics of millimeter wave propagation. Therefore, there is a need in the industry for an improved and efficient mechanism for a user equipment (UE) to handle beam failure recovery in the SCell.

SUMMARY

The present disclosure is directed to a method for SCell BFR performed by a base station (BS) in the next generation wireless communication networks.

According to an aspect of the present disclosure, a BS for performing SCell BFR is provided. The BS includes one or more non-transitory computer-readable media having computer-executable instructions embodied thereon and at least one processor coupled to the one or more non-transitory computer-readable media. The at least one processor is configured to execute the computer-executable instructions to: receive, from a UE, a BFR Medium Access Control (MAC) Control Element (CE) that includes a cell index of an SCell for which a beam failure is detected, and a reference signal index for the SCell, the BFR MAC CE being transmitted, by the UE, via an uplink (UL) transmission associated with a Hybrid Automatic Repeat Request (HARQ) process having a HARQ process identifier (ID); and transmit, to the UE, Downlink Control Information (DCI) that schedules a Physical Uplink Shared Channel (PUSCH) transmission with the HARQ process ID of the HARQ process that is used for the UL transmission of the BFR MAC CE, the DCI indicating a toggled New Data Indicator (NDI) value, wherein the UE is configured to: determine, upon receiving the DCI, that the SCell BFR procedure is successfully completed; and monitor, on the SCell, a Physical Downlink Control Channel (PDCCH) using antenna port quasi-colocation parameters associated with the reference signal index after receiving the DCI.

According to another aspect of the present disclosure, a method for S Cell BFR performed by a BS is provided. The method includes: receiving, from a UE, a BFR MAC CE that includes a cell index of an SCell for which a beam failure is detected, and a reference signal index for the SCell, the BFR MAC CE being transmitted, by the UE, via a UL transmission associated with a HARQ process having a HARQ process ID; and transmitting, to the UE, DCI that schedules a PUSCH transmission with the HARQ process ID of the HARQ process that is used for the UL transmission of the BFR MAC CE, the DCI indicating a toggled NDI value, wherein the UE is configured to: determine, upon receiving the DCI, that the SCell BFR procedure is successfully completed; and monitor, on the S Cell, a Physical Downlink Control Channel (PDCCH) using antenna port quasi-colocation parameters associated with the reference signal index after receiving the DCI.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

The following description contains specific information pertaining to implementations of the present application. The drawings in the present application and their accompanying detailed description are directed to merely example implementations. However, the present application is not limited to merely these example implementations. Other variations and implementations of the present application will be obvious to those skilled in the art. Unless noted otherwise, like or corresponding elements among the drawings may be indicated by like or corresponding reference numerals. Moreover, the drawings and illustrations in the present application are generally not to scale and are not intended to correspond to actual relative dimensions.

For the purposes of consistency and ease of understanding, like features may be identified (although, in some examples, not shown) by the same numerals in the drawings. However, the features in different implementations may be different in other respects, and thus shall not be narrowly confined to what is shown in the drawings.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising" means "including, but not necessarily limited to"; it specifically indicates open-ended inclusion or membership in the so-described combination, group, series, and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standards, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present application may be implemented by hardware, software, or a combination of software and hardware. Described functions may correspond to modules which may be software, hardware, firmware, or any combination thereof. The software implementation may comprise computer-executable instructions stored on a computer-readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Application-Specific Integrated Circuits (ASICs), programmable logic arrays, and/or using one or more Digital Signal Processor (DSPs). Although some of the described implementations are oriented to software installed and executing on computer hardware, alternative implementations implemented as firmware, as hardware, or as a combination of hardware and software are well within the scope of the present application.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LIE-Advanced Pro system, or a 5G NR Radio Access Network (RAN)) typically includes at least one base station (BS), at least one UE, and one or more optional network elements that provide connection within a network. The UE communicates with the network (e.g., a Core Network (CN), an Evolved Packet Core (EPC) network, an Evolved Universal Terrestrial Radio Access network (E-UTRAN), a 5G Core (5GC), or an internet) through a RAN established by one or more base stations.

It should be noted that, in the present application, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM) that is often referred to as 2G, GSM Enhanced Data rates for GSM Evolution (EDGE) Radio Access Network (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE), e.g., LTE connected to 5GC, NR (often referred to as 5G), and/or LTE-A Pro. However, the scope of the present application should not be limited to the listed protocols.

A base station may include, but is not limited to, a node B (NB) as in the UNITS, an evolved node B (eNB) as in LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink (DL) and optionally uplink (UL) resources to at least one UE within its radio coverage for DL and optionally UL packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval (TTI) of a single NR frame, at least DL transmission data, a guard period, and uplink (UL) transmission data should be included. The respective portions of the DL transmission data, the guard period, and the UL transmission data should also be configurable, for example, based on the network dynamics of NR. In addition, sidelink resources may also be provided in an NR frame to support ProSe services or V2X services.

The terms "system" and "network" as used herein may be used interchangeably. The term "and/or" as used herein is only an association relationship for describing associated objects and represents that three relationships may exist. For example, A and/or B may indicate that: A exists alone, A and B exist at the same time, or B exists alone. In addition, the character "/" as used herein generally represents that the associated objects are in an "or" relationship.

Figure 1:
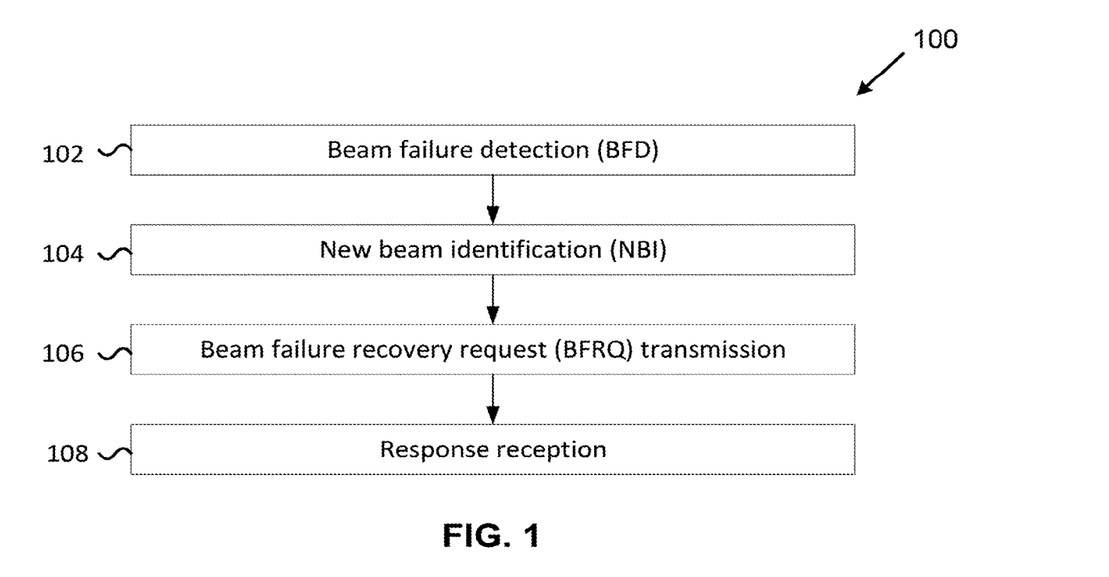
FIG. 1 is a flowchart of an example method for beam failure recovery (BFR) performed by a UE, according to an example implementation of the present application.

FIG. 1 is a flowchart of a method 100 for beam failure recovery (BFR) performed by a UE, according to an example implementation of the present application. In action 102, the UE may perform beam failure detection (BFD) to detect a beam failure condition in a cell (e.g., an SCell). The UE may be explicitly or implicitly configured with a set of BFD reference signals (RS), which may include a Channel State Information Reference Signal (CSI-RS) and a Synchronization Signal Block (SSB). In one implementation, an explicit configuration of the BFD RS may be transmitted via Radio Resource Control (RRC) signaling. On the other hand, the UE may determine the BFD RS by itself if the BFD RS is implicitly configured. The UE may detect the beam failure condition by measuring the BFD RS, such as determining a BLock Error Rate (BLER) based on the measurement of the BFD RS. In one implementation, each time the determined BLER exceeds a threshold may be considered as a beam failure instance, and the UE may declare a beam failure condition is detected when the number of consecutive beam failure instances exceeds a specific value.

In action 104, the UE may perform new beam identification (NBI) to find a new beam pair link on which connectivity between the UE and an associated BS may be restored. The UE may be explicitly or implicitly configured with a set of NBI RS, which may include CSI-RS and/or SSB. In one implementation, an explicit configuration of the NBI RS may be transmitted via RRC signaling. On the other hand, the UE may determine the NBI RS by itself if the NBI RS is implicitly configured. The set of NBI RS may correspond to a set of candidate beams. The UE may determine a new candidate beam from the set of NBI RS. In one implementation, the UE may measure the quality (e.g., Layer 1 Reference Signal Received Power (L1-RSRP)) of the NBI RS to choose the new candidate beam from the set of NBI RS. It should be noted that the order of actions described in FIG. 1 is not intended to be construed as a limitation. For example, action 104 may be followed by action 102 in one implementation.

In action 106, the UE may transmit a beam failure recovery request (BFRQ) to a base station after the UE has detected a beam failure condition. In one implementation, the UE may have identified a new candidate beam (e.g., in action 104) before transmitting the BFRQ as well. The BFRQ informs the network that a beam failure has been detected. In one implementation, the BFRQ may include information about the new candidate beam.

In one implementation, for beam failure that takes place in a special cell (e.g., a PCell or a PSCell), the BFRQ may be transmitted on a Physical Random Access Channel (PRACH). In principle, both contention-free and contention-based PRACH resources may be used. In one implementation, a contention-free PRACH resource may be prioritized over a contention-based PRACH resource. A two-step contention-free random access procedure may include preamble transmission and random access response. In one implementation, each reference signal corresponding to the different candidate beams may be associated with a specific preamble configuration.

In action 108, the UE may receive a response from the network. In one implementation, a specific control resource set (CORESET) or search space is defined for response reception (e.g., CORESET-BFR or a SearchSpace-BFR indicated by a higher layer parameter recoverySearchSpaceId). The UE may monitor Physical Downlink Control Channel (PDCCH) transmission on the CORESET-BFR/SearchSpace-BFR to determine if the BFRQ is successfully received by the network. A Downlink Control Information (DCI) format in the CORESET-BFR/SearchSpace-BFR may be considered as a successful network response. In one implementation, the UE may assume that the network, when responding to the BFRQ, is transmitting PDCCH quasi co-located (QCL) with the RS associated with the new candidate beam in the BFRQ.

It should be noted that the term "beam" may be replaced by "spatial filter". For example, when the UE reports a new candidate beam (e.g., a gNB TX beam), the UE is essentially selecting a spatial filter used by the gNB. The term "beam information" may represent information indicating which beam is used or which spatial filter is selected. In one implementation, individual reference signals may be transmitted by applying individual beams (or spatial filters). Thus, beam information may be represented by reference signal resource indexes.

The previous description relates to PRACH-based BFRQ transmission and network response, which may be used in a special cell BFR procedure. For BFR in an SCell, the BFRQ transmission in action 106 in FIG. 1 may be on (a) a PRACH, (b) a PUSCH, or (c) a Physical Uplink Control Channel (PUCCH). In one implementation, the BFRQ may be transmitted on the PUSCH. The UE may transmit a BFR MAC CE on the PUSCH to carry the BFRQ. The transmission of the BFR MAC CE may be associated with a Hybrid Automatic Repeat Request (HARQ) process having a HARQ process ID. In one implementation, the BFRQ (e.g., the BFR MAC CE if BFRQ is transmitted on the PUSCH) may include a cell index of an S Cell in which beam failure occurs. In one implementation, the BFRQ (e.g., the BFR MAC CE) may include a cell index of an SCell in which beam failure occurs (as determined in action 102 in FIG. 1) and a new candidate beam index for the SCell (as determined in action 104 in FIG. 1). In one implementation, the PUSCH for transmitting the BFRQ may be obtained from a preceding scheduling request (SR) transmission via a PUCCH or from a configured grant resource.

Several implementations are provided below for the network response illustrated in action 108 in FIG. 1.

Case 1: Determination of SCell BFR Success—Implicit Response

In one implementation, the UE may consider the BFR procedure successfully completed upon receiving a response from the network including a DCI format that indicates to the UE to flush a soft buffer of the HARQ process ID used to transmit the BFRQ information. In one implementation, the UE may consider the BFR procedure successfully completed upon receiving a DCI format that schedules a PUSCH transmission with the HARQ process ID, where the DCI format indicates a toggled New Data Indicator (NDI) value. For example, when the transmission of the BFR MAC CE is associated with a HARQ process having a HARQ process ID #2 in action 106, the UE may determine that the network successfully received the BFR MAC CE upon receiving the DCI format that schedules a PUSCH transmission with HARQ process ID #2 and indicates a toggled NDI value in action 108. In one implementation, the UE may consider the BFR procedure successfully completed upon receiving an uplink grant for a new transmission (e.g., indicating a toggled NDI value) for the HARQ process used for the transmission of the BFR MAC CE.

In one implementation, the UE may consider the BFR procedure successfully completed upon receiving a MAC CE that indicates a change in a PDCCH Transmission Configuration Indication (TCI) state for the SCell triggering the BFRQ transmission.

In one implementation, after determining that the SCell BFR procedure is successfully completed, the UE may receive a PDCCH on the SCell in which beam failure occurs with antenna port quasi-colocation parameters associated with the new candidate beam index in the BFR MAC CE after receiving the DCI format indicating a toggled NDI value and scheduling the PUSCH transmission with the HARQ process ID used for transmission of the BFR MAC CE.

Figure 2:
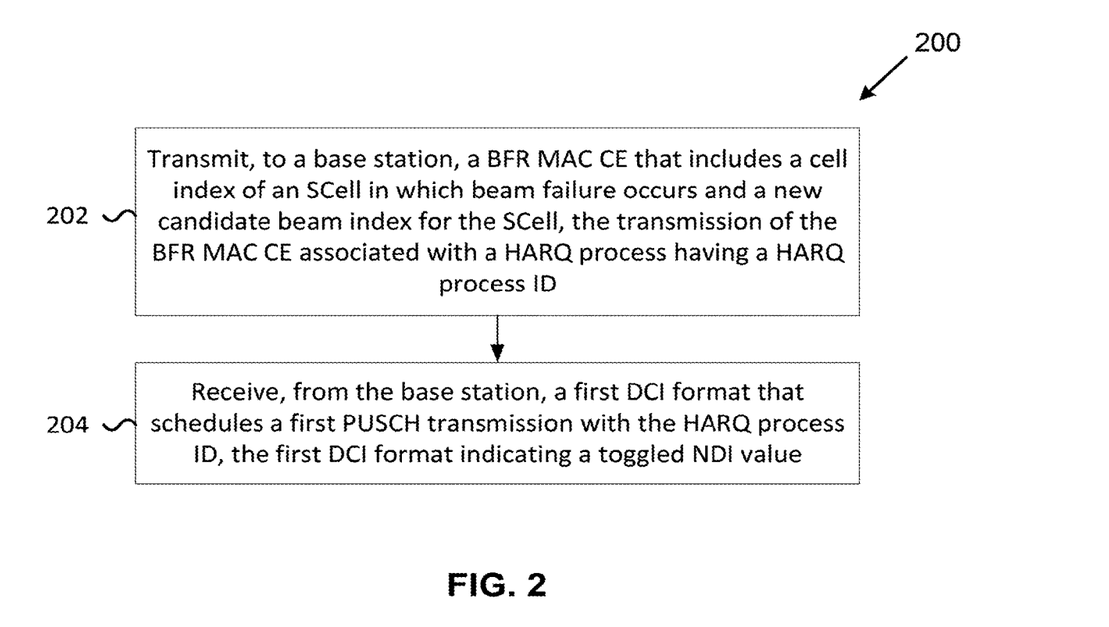
FIG. 2 is a flowchart of an example method for S Cell BFR performed by a UE, according to an example implementation of the present application.

FIG. 2 is a flowchart of an example method for S Cell BFR performed by a UE, according to an example implementation of the present application. In action 202, the UE transmits, to a base station, a BFR MAC CE that includes a cell index of an SCell in which beam failure occurs and a new candidate beam index for the SCell, where the transmission of the BFR MAC CE is associated with a HARQ process having a HARQ process ID. Action 202 may relate to action 106 for BFRQ transmission in FIG. 1. In action 204, the UE receives, from the base station, a first DCI format that schedules a first PUSCH transmission with the HARQ process ID that is used in action 202, where the first DCI format indicates a toggled NDI value. Action 204 may relate to action 108 for response reception in FIG. 1. In one implementation, the UE may consider the first DCI format in action 204 as an acknowledgement message from the base station, indicating the BFR MAC CE in action 202 has been successfully received by the base station. In one implementation, the UE may receive a PDCCH on the SCell with antenna port quasi-colocation parameters associated with the new candidate beam index after receiving the first DCI format.

Figure 3:
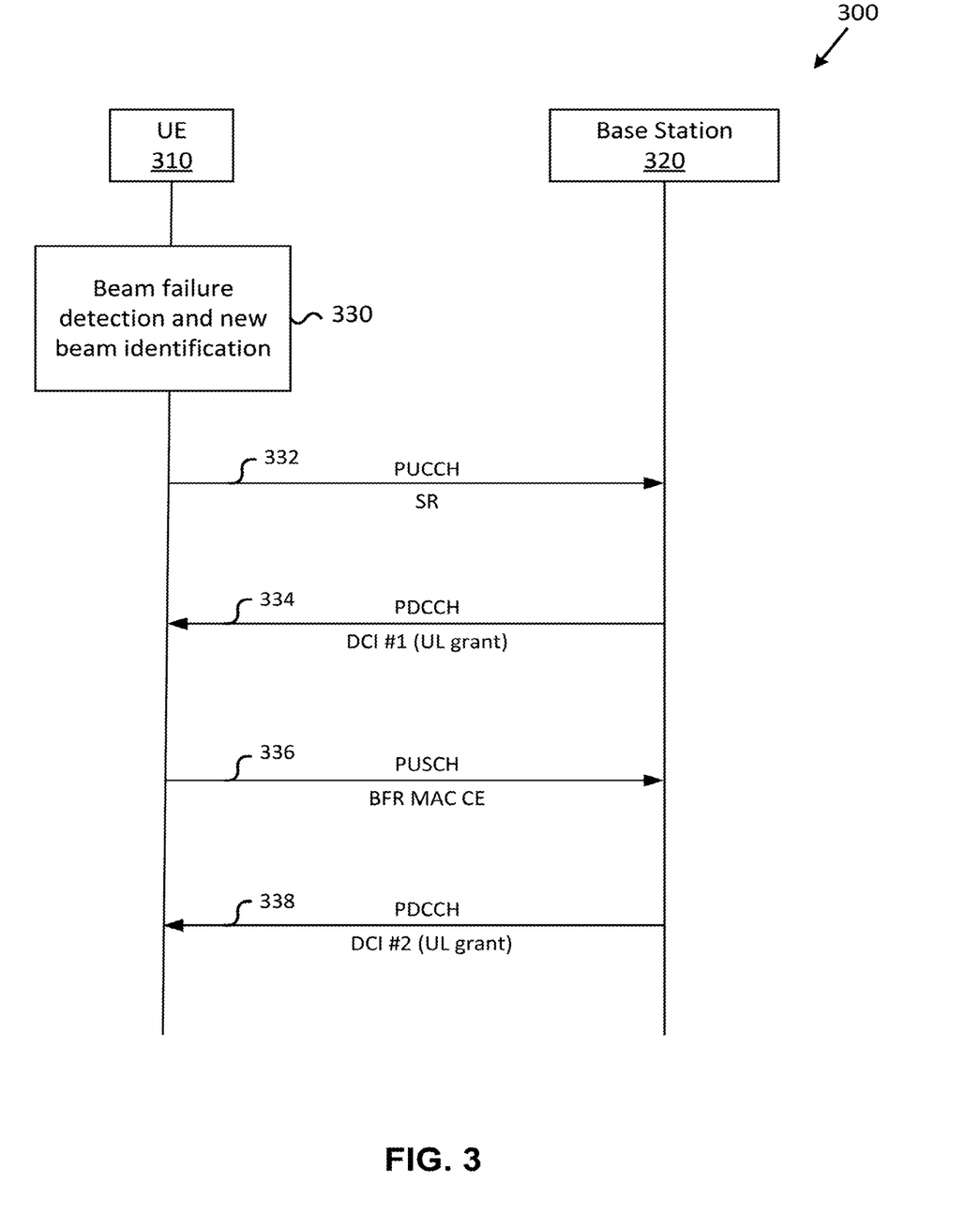
FIG. 3 is a diagram illustrating an example method for an SCell BFR procedure, according to an example implementation of the present application.

FIG. 3 is a diagram illustrating an example method for an SCell BFR procedure, according to an example implementation of the present application. In action 330, UE 310 performs beam failure detection and new beam identification. UE 310 may generate a BFRQ when a beam failure condition is detected in action 330. In one implementation, the BFRQ may be a BFR MAC CE that carries a cell index of an SCell in which beam failure occurs and a new candidate beam index for the SCell. In one implementation, UE 310 may transmit a scheduling request (SR) to base station 320 in action 332 to request a UL resource for transmitting the BFR MAC CE. In one implementation, the SR in action 332 may be dedicatedly configured for BFR. The SR may be transmitted on a PUCCH.

In action 334, UE 310 may receive, from base station 320, DCI #1 (e.g., UL grant) that schedules a PUSCH transmission during which the BFR MAC CE may be transmitted. DCI #1 may be transmitted on a PDCCH. DCI #1 may be associated with a HARQ process ID (e.g., HARQ process #3). DCI #1 may include an NDI value (e.g., 0). In action 336, UE 310 may transmit the BFR MAC CE to base station 320 on a PUSCH scheduled by DCI #1. The transmission of the BFR MAC CE in action 336 may be associated with a HARQ process having the HARQ process ID such as HARQ process #3. In action 338, UE 310 may receive, from base station 320, DCI #2 (e.g., UL grant) that schedules a PUSCH transmission with the same HARQ process ID used in action 336 (e.g., HARQ process #3). An NDI value in DCI #2 (e.g., 1) is toggled compared to the NDI value in DCI #1 (e.g., 0). UE 310 may consider the SCell BFR procedure as successfully completed after receiving DCI #2 in action 338.

In one implementation, the PUSCH resource in which the BFR MAC CE is transmitted in action 336 may be allocated by a configured grant rather than a dynamic grant such that action 332 and action 334 may be omitted. In addition, if DCI #2 in action 338 is scrambled by a configured scheduling radio network temporary identifier (CS-RNTI) of UE 310, the NDI value in DCI #2 may be considered toggled irrespective of its value. In other words, in one implementation, DCI #2 may indicate a toggled NDI value if DCI #2 is scrambled by CS-RNTI of UE 310 when a configured grant is used for the BFR MAC CE, if DCI #2 is not validated as an activation/release command for a configured UL type-2 grant.

Case 2: Determination of SCell BFR Success—Explicit Response

In one implementation, the UE may consider the BFR procedure successfully completed upon receiving a DCI format in the CORESET-BFR corresponding to the SCell in which beam failure occurs. For example, the UE may consider SCell BFR as successful upon receiving the DCI format within a predetermined or configured time window. The CORESET-BFR may be a dedicated PDCCH CORESET configured for BFR. The dedicated PDCCH CORESET may be used solely for BFR purposes. In another implementation, the CORESET-BFR may be shared with another purpose in a time division multiplexing (TDM) manner. For example, within the configured time window, the CORESET-BFR may only be used for BFR but not others. This may be achieved by configuring a dedicated search space which is associated with the CORESET-BFR for BFR purposes. Since the dedicated search space provide time domain monitoring pattern, the configured time window may be implemented this way. In one implementation, the CORESET-BFR may be configured in the SCell in which beam failure occurs. In one implementation, the CORESET-BFR may be configured in another serving cell other than the SCell in which beam failure occurs.

In one implementation, the UE may consider the BFR procedure successfully completed upon receiving a MAC CE that indicates successful reception of a corresponding BFRQ transmission. In one implementation, the MAC CE may carry information to identify with which BFR procedure the response is associated. For example, the UE may trigger multiple BFR procedures and the MAC CE in the network response may indicate one or more of the triggered BFR procedures as successful, such as by using an index or a bitmap. In one implementation, the BFRQ may include multiple SCell indexes when beam failure occurs in multiple SCells and the MAC CE may carry one or more cell indexes to indicate which SCell BFR procedure is successful.

In one implementation, after determining that the SCell BFR procedure is successfully completed, the UE may receive PDCCH on the SCell in which beam failure occurs with antenna port quasi-colocation parameters associated with the new candidate beam index that is carried in the BFR MAC CE.

Case 3: Determination of SCell BFR Failure

In one implementation, the UE may be configured with a BFR timer such as via RRC signaling. In one implementation, the UE may start the BFR timer upon detecting a beam failure condition. Beam failure detection may be referred to action 102 in FIG. 1. In one implementation, the UE may start the BFR timer when the UE transmits the BFR MAC CE. Transmission of the BFR MAC CE may be referred to action 202 in FIG. 2.

In one implementation, the UE may start the BFR timer when the first PUCCH with BFR information is transmitted. In one implementation, SR transmitted in action 332 in FIG. 3 may be the first PUCCH with BFR information. In one implementation, the BFRQ may be transmitted on a PUCCH, and the BFRQ on the PUCCH may be the first PUCCH with BFR information. The UE may start the BFR timer when the UE transmits the BFRQ on the PUCCH. In one implementation, the BFR timer may be started at a predetermined/configured time after the first PUCCH with BFR information is transmitted. For example, the predetermined/configured time may be one or more symbols or one or more slots. In one implementation, the UE may start the BFR timer at the beginning of a next symbol or next slot after the first PUCCH with BFR information is transmitted.

In one implementation, the UE may stop the BFR timer when the UE considers the SCell BFR as successful. The network response for indicating a successful SCell BFR may be referred to implementations provided in Case 1 and Case 2. In one implementation, the UE (e.g., a MAC entity of the UE) may optionally indicate to a higher layer (e.g., RRC layer) the success of the SCell BFR.

In one implementation, the UE may consider the SCell BFR procedure as failed if the network response is not received within a configured time period such as an expiration time of the BFR timer. In one implementation, the UE may stop the SCell BFR procedure when the BFR timer expires and prohibit further BFRQ transmission.

Figure 4:
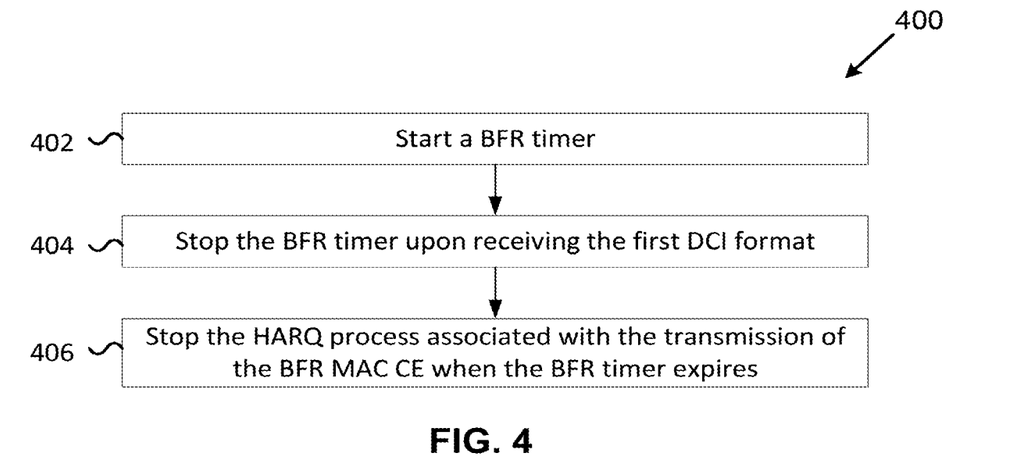
FIG. 4 is a flowchart of an example method for SCell BFR when a UE is configured with a BFR timer, according to an example implementation of the present application.

FIG. 4 is a flowchart of an example method for SCell BFR when a UE is configured with a BFR timer, according to an example implementation of the present application. In action 402, the UE may start the BFR timer. Several implementations regarding when the BFR timer may be started have been described previously. In action 404, the UE may stop the BFR timer upon receiving the first DCI format that indicates a toggled NDI value and schedules the PUSCH transmission with the HARQ process ID used for transmission of the BFR MAC CE. The UE may consider the SCell BFR as successful upon receiving the first DCI format. In action 406, the UE may stop the HARQ process associated with the transmission of the BFR MAC CE when the BFR timer expires. The UE may consider the SCell BFR as failed if the network response is not received when the BFR timer expires.

Case 4: Observing a Network Response

In one implementation, the UE may observe the network response for a BFRQ (e.g., a BFR MAC CE) in the SCell in which beam failure occurs. In one implementation, the UE may apply the reported new beam information on all configured CORESET(s)/SearchSpace(s) or on a dedicated CORESET/SearchSpace in the SCell for response reception. In one implementation, the UE may apply beam information that is originally indicated by the base station (e.g., via TCI activation MAC CE(s) for control channel(s)) on all CORESET(s)/SearchSpace(s) in the SCell for response reception.

In one implementation, the UE may observe the network response in an intra-band SCell that is different from the S Cell in which beam failure occurs. In one implementation, the UE may apply the reported new beam information on all configured CORESET(s)/SearchSpace(s) or on a dedicated CORESET/SearchSpace in the intra-band SCell for response reception. In one implementation, the UE may apply beam information that is originally indicated by the base station (e.g., via TCI activation MAC CE(s) for control channel(s)) on all CORESET(s)/SearchSpace(s) in the intra-band SCell for response reception.

In one implementation, where the UE observes the network response may depend on the PUSCH resource for BFRQ transmission (e.g., PUSCH in action 336) allocated by the UL grant (e.g., DCI #1 in action 334). For example, the UE may observe the network response in the cell where the PUSCH resource is allocated. In one implementation, the UE may apply the reported new beam information on all configured CORESET(s)/SearchSpace(s) or on a dedicated CORESET/SearchSpace in the cell in which the PUSCH resource is allocated for response reception. In one implementation, the UE may apply beam information that is originally indicated by the base station (e.g., via TCI activation MAC CE(s) for control channel(s)) on all CORESET(s)/SearchSpace(s) in the cell for response reception.

In one implementation, where the UE observes the network response may depend on network implementation. The network response may be transmitted on any serving cell. In one example, the UE may apply beam information that is originally indicated by the base station (e.g., via TCI activation MAC CE(s) for control channel(s)) on all CORESET(s)/SearchSpace(s) in corresponding cells for response reception.

Case 5: SCell BFR in Cross-Carrier Scheduling

Figure 5:
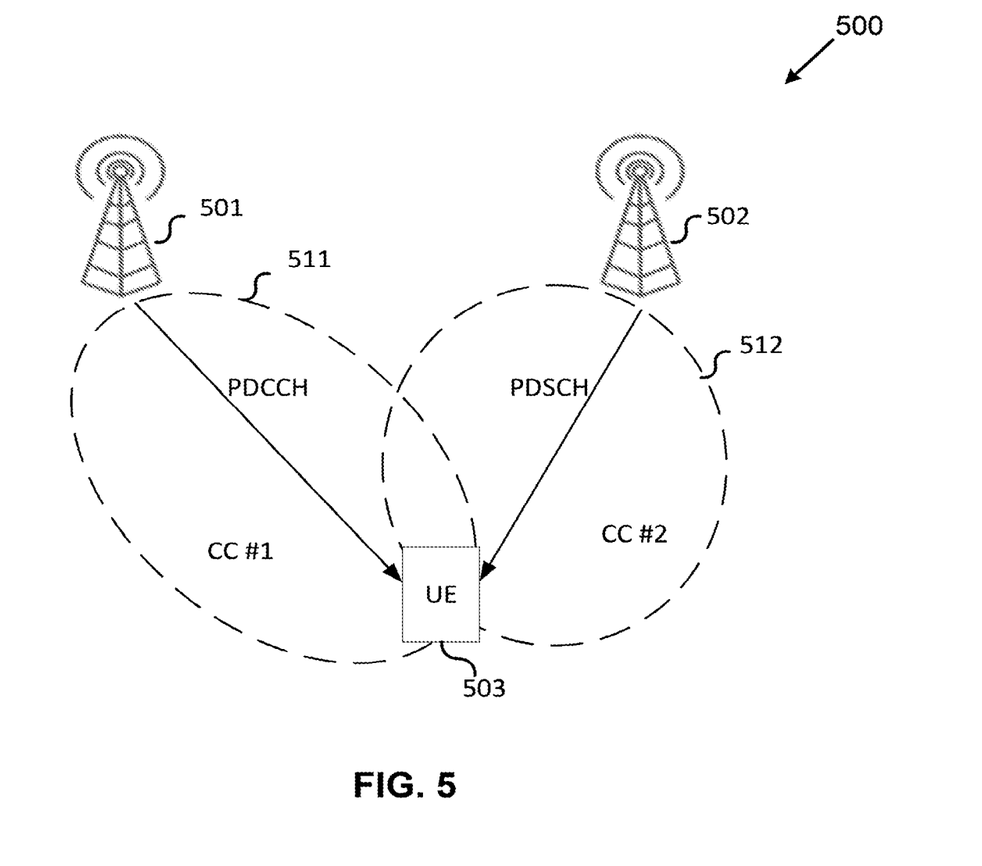
FIG. 5 is a diagram illustrating an example cross-carrier scheduling scenario, according to an example implementation of the present application.

FIG. 5 is a diagram 500 illustrating a cross-carrier scheduling scenario according to an example implementation of the present application. A BS 501 may provide coverage over component carrier (CC) #1 and a BS 502 may provide coverage over CC #2. As illustrated, cell 512 is cross-carrier scheduled by cell 511. In other words, a PDCCH on cell 511 may include scheduling information of a PDSCH on cell 512. Cell 511 may be referred as a scheduling cell and cell 512 may be referred to as a scheduled cell. In one implementation, cell 512 may be an SCell and cell 511 may be a PCell, a PSCell, or an SCell.

In one implementation, an SCell BFR procedure may be triggered in cell 512 to maintain the control channel quality of CC #2. For example, UE 503 may detect a beam failure condition in cell 512 and subsequently transmit a BFRQ. In one implementation, a DCI format with a carrier indicator field (CIF) in the scheduling cell (e.g., cell 511) may be considered as a network response to the BFRQ of the scheduled cell (e.g., cell 512). It should be noted that various implementations of the network response provided in Case 1 and Case 2 may be combined with the DCI format having the CIF field used in cross-carrier scheduling.

In one implementation, the UE may observe the network response in the scheduling cell (e.g., cell 511). In one implementation, the UE may apply the reported new beam information on all configured CORESET(s)/SearchSpace(s) in the scheduling cell for response reception. In one implementation, the UE may apply beam information that is originally indicated by the base station (e.g., via TCI activation MAC CE(s) for control channel(s)) on individual CORESET(s)/SearchSpace(s) in the scheduling cell for response reception.

In one implementation, the UE may observe the network response in the scheduled cell (e.g., cell 512). In one implementation, the UE may apply the reported new beam information on all configured CORESET(s)/SearchSpace(s) in the scheduled cell for response reception. In one implementation, the UE may apply beam information that is originally indicated by the base station (e.g., via TCI activation MAC CE(s) for control channel(s)) on individual CORESET(s)/SearchSpace(s) in the scheduled cell for response reception.

Figure 6:
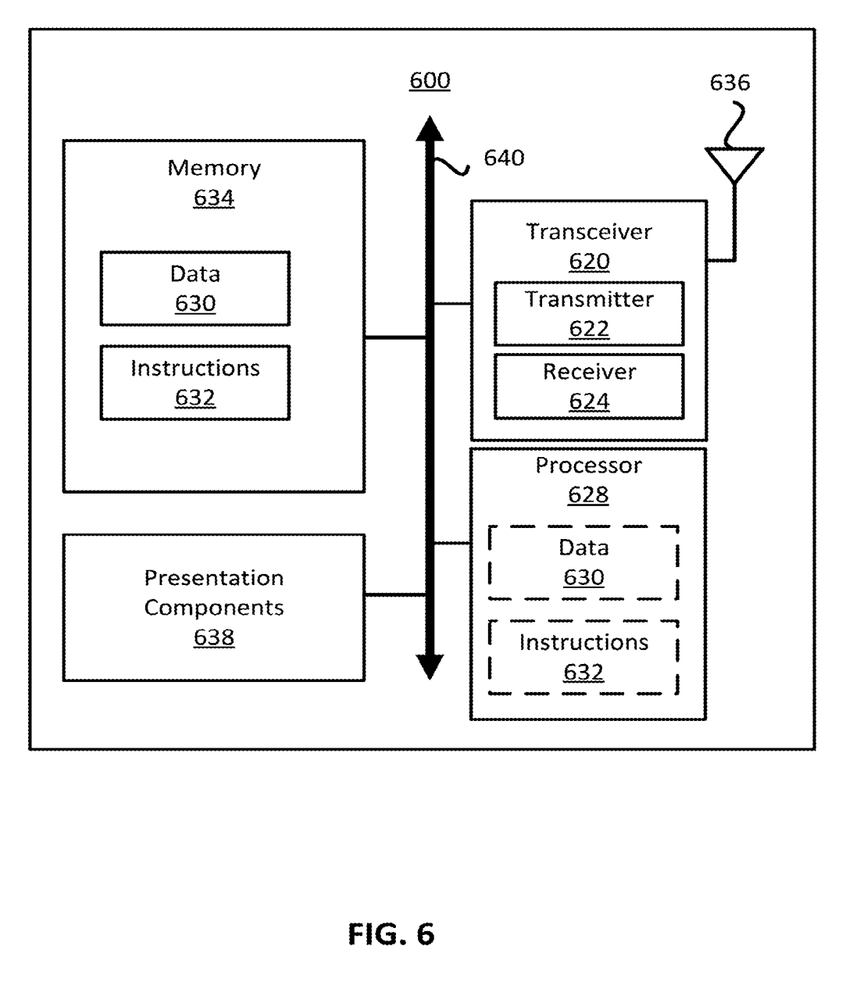
FIG. 6 is a block diagram illustrating a node for wireless communication, in accordance with various aspects of the present application.

FIG. 6 is a block diagram illustrating a node for wireless communication according to the present application. As illustrated in FIG. 6, a node 600 may include a transceiver 620, a processor 628, a memory 634, one or more presentation components 638, and at least one antenna 636. The node 600 may also include a radio frequency (RF) spectrum band module, a base station (BS) communications module, a network communications module, and a system communications management module, Input/Output (I/O) ports, I/O components, and power supply (not explicitly shown in FIG. 6). Each of these components may be directly or indirectly in communication with each other over one or more buses 640. In one implementation, the node 600 may be a UE or a base station that performs various functions described herein with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, removable and non-removable media. By way of example, and not limitation, computer-readable media may comprise computer storage media and communication media. Computer storage media include both volatile and non-volatile, removable, and non-removable media implemented in any method or technology for storage of information such as computer-readable instructions, data structures, program modules, or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory includes solid-state memory, hard drives, optical-disc drives, etc. As illustrated in FIG. 6, the memory 634 may store computer-readable, computer-executable instructions 632 (e.g., software codes) that are configured to cause the processor 628 to perform various functions described herein, for example, with reference to FIGS. 1 through 5. Alternatively, the instructions 632 may not be directly executable by the processor 628 but be configured to cause the node 600 (e.g., when compiled and executed) to perform various functions described herein.

The processor 628 (e.g., having processing circuitry) may include an intelligent hardware device, e.g., a Central Processing Unit (CPU), a microcontroller, an ASIC, etc. The processor 628 may include memory. The processor 628 may process the data 630 and the instructions 632 received from the memory 634, and information transmitted and received via the transceiver 620, the baseband communications module, and/or the network communications module. The processor 628 may also process information to be sent to the transceiver 620 for transmission via the antenna 636 to the network communications module for transmission to a core network.

One or more presentation components 638 present data indications to a person or another device. Examples of presentation components 638 include a display device, a speaker, a printing component, and a vibrating component, etc.

In view of the disclosure, it is obvious that various techniques may be used for implementing the concepts in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described and many rearrangements, modifications, and substitutions are possible without departing from the scope of the present disclosure.

What is claimed is:

1. A base station (BS) for performing a Secondary Cell (SCell) Beam Failure Recovery (BFR) procedure, the BS comprising:
   one or more non-transitory computer-readable media having computer-executable instructions embodied thereon; and
   at least one processor coupled to the one or more non-transitory computer-readable media, the at least one processor configured to execute the computer-executable instructions to:
   receive, from a user equipment (UE), a BFR Medium Access Control (MAC) Control Element (CE) that includes a cell index of an SCell for which a beam failure is detected, and a reference signal index for the S Cell, the BFR MAC CE being transmitted, by the UE, via an uplink (UL) transmission associated with a Hybrid Automatic Repeat Request (HARQ) process having a HARQ process identifier (ID); and
   transmit, to the UE, Downlink Control Information (DCI) that schedules a Physical Uplink Shared Channel (PUSCH) transmission with the HARQ process ID of the HARQ process that is used for the UL transmission of the BFR MAC CE, the DCI indicating a toggled New Data Indicator (NDI) value,
wherein the UE is configured to:
  determine, upon receiving the DCI, that the SCell BFR procedure is successfully completed; and
  monitor, on the S Cell, a Physical Downlink Control Channel (PDCCH) using antenna port quasi-colocation parameters associated with the reference signal index after receiving the DCI.

2. The BS of claim 1, wherein the at least one processor is further configured to execute the computer-executable instructions to:
  indicate, via at least one Transmission Configuration Indication (TCI) activation MAC CE, beam information to the UE, wherein the UE is further configured to:
  apply the beam information to receive the DCI.

3. The BS of claim 1, wherein the at least one processor is further configured to execute the computer-executable instructions to:
  configure, via signaling, a BFR timer to the UE, wherein the UE is further configured to:
  start, before receiving the DCI, the BFR timer; and
  stop the BFR timer upon receipt of the DCI.

4. The BS of claim 3, wherein the UE is further configured to:
  start the BFR timer upon detection of the beam failure.

5. The BS of claim 3, wherein the UE is further configured to:
  stop the BFR timer when the S Cell BFR procedure is determined as successfully completed.

6. The BS of claim 3, wherein starting the BFR timer before receiving the DCI comprises starting the BFR timer when the BFR MAC CE is transmitted.

7. The BS of claim 1, wherein the at least one processor is further configured to execute the computer-executable instructions to:
  receive a Scheduling Request (SR) for BFR.

8. The BS of claim 7, wherein the SR requests a UL resource for transmitting the BFR MAC CE.

9. The BS of claim 1, wherein:
  the toggled NDI value is compared to an NDI value associated with the BFR MAC CE, and
  the toggled NDI value is different from the NDI value associated with the BFR MAC CE.

10. A method for a Secondary Cell (SCell) Beam Failure Recovery (BFR) procedure performed by a base station (BS), the method comprising:
  receiving, from a user equipment (UE), a BFR Medium Access Control (MAC) Control Element (CE) that includes a cell index of an S Cell for which a beam failure is detected, and a reference signal index for the SCell, the BFR MAC CE being transmitted, by the UE, via an uplink (UL) transmission associated with a Hybrid Automatic Repeat Request (HARQ) process having a HARQ process identifier (ID); and
  transmitting, to the UE, Downlink Control Information (DCI) that schedules a Physical Uplink Shared Channel (PUSCH) transmission with the HARQ process ID of the HARQ process that is used for the UL transmission of the BFR MAC CE, the DCI indicating a toggled New Data Indicator (NDI) value,
wherein the UE is configured to:
  determine, upon receiving the DCI, that the SCell BFR procedure is successfully completed; and
  monitor, on the SCell, a Physical Downlink Control Channel (PDCCH) using antenna port quasi-colocation parameters associated with the reference signal index after receiving the DCI.

11. The method of claim 10, further comprising:
  indicating, via at least one Transmission Configuration Indication (TCI) activation MAC CE, beam information to the UE, wherein the UE is further configured to:
  apply the beam information to receive the DCI.

12. The method of claim 10, further comprising:
  configuring, via signaling, a BFR timer to the UE, wherein the UE is further configured to:
  start, before receiving the DCI, the BFR timer; and
  stop the BFR timer upon receipt of the DCI.

13. The method of claim 12, wherein the UE is further configured to:
  start the BFR timer upon detection of the beam failure.

14. The method of claim 12, wherein the UE is further configured to:
  stop the BFR timer when the S Cell BFR procedure is determined as successfully completed.

15. The method of claim 12, wherein starting the BFR timer before receiving the DCI comprises starting the BFR timer when the BFR MAC CE is transmitted.

16. The method of claim 10, further comprising:
  receiving a Scheduling Request (SR) for BFR.

17. The method of claim 16, wherein the SR requests a UL resource for transmitting the BFR MAC CE.

18. The method of claim 10, wherein:
  the toggled NDI value is compared to an NDI value associated with the BFR MAC CE, and
  the toggled NDI value is different from the NDI value associated with the BFR MAC CE.

* * * * *